United States Patent
Büttner et al.

(10) Patent No.: US 10,484,138 B2
(45) Date of Patent: Nov. 19, 2019

(54) METHOD FOR TRANSMITTING DATA PACKETS ON A DATA TRANSMISSION PATH BETWEEN TWO COMMUNICATION SUBSCRIBERS, AUTOMATION SYSTEM AND COMPUTER PROGRAM

(71) Applicant: BECKHOFF AUTOMATION GMBH, Verl (DE)

(72) Inventors: Holger Büttner, Berlin (DE); Florian Essler, Nürnberg (DE); Rainer Hoffmann, Schwaig (DE); Dirk Janssen, Verl (DE); Karl Weber, Altdorf (DE)

(73) Assignee: Beckhoff Automation GmbH, Verl (DE)

( * ) Notice: Subject to any disclaimer, the term of this patent is extended or adjusted under 35 U.S.C. 154(b) by 121 days.

(21) Appl. No.: 15/800,669

(22) Filed: Nov. 1, 2017

(65) Prior Publication Data

US 2018/0123738 A1    May 3, 2018

(30) Foreign Application Priority Data

Nov. 3, 2016  (DE) .......................... 10 2016 121 019

(51) Int. Cl.

| H04L 1/08 | (2006.01) |
|---|---|
| H04L 1/18 | (2006.01) |
| H04L 1/16 | (2006.01) |
| H04L 12/741 | (2013.01) |

(52) U.S. Cl.
CPC .............. *H04L 1/08* (2013.01); *H04L 1/1628* (2013.01); *H04L 1/1657* (2013.01); *H04L 1/1858* (2013.01); *H04L 45/74* (2013.01)

(58) Field of Classification Search
CPC ......... H04L 1/08; H04L 45/74; H04L 1/1628; H04L 1/1657; H04L 1/1858
USPC .......................................... 714/749, 748, 750
See application file for complete search history.

(56) References Cited

U.S. PATENT DOCUMENTS

| 8,363,550 | B1 | 1/2013 | Yuan et al. |
| 9,246,852 | B2 | 1/2016 | Chandhoke et al. |
| 10,003,660 | B2* | 6/2018 | Furr ........................ H04L 67/16 |
| 2014/0254349 | A1 | 9/2014 | Jia et al. |
| 2015/0063358 | A1 | 3/2015 | Wu et al. |
| 2017/0251065 | A1* | 8/2017 | Furr ........................ H04L 67/16 |

FOREIGN PATENT DOCUMENTS

| DE | 102004044764 A1 | 3/2006 |
| EP | 1307989 B1 | 11/2008 |

* cited by examiner

*Primary Examiner* — John J Tabone, Jr.
(74) *Attorney, Agent, or Firm* — Dorsey & Whitney LLP

(57) ABSTRACT

A first communication subscriber transmits a first data packet comprising data and an identification character to the second communication subscriber. The first communication subscriber and the second communication subscriber respectively determine a first and a second acknowledgement character on the basis of the identification character. The second communication subscriber transmits a second data packet comprising the second acknowledgement character back to the first communication subscriber. The first communication subscriber can thus check, on the basis of the second acknowledgement character, whether the first data packet arrived at the second communication subscriber.

18 Claims, 3 Drawing Sheets

METHOD FOR TRANSMITTING DATA PACKETS ON A DATA TRANSMISSION PATH BETWEEN TWO COMMUNICATION SUBSCRIBERS, AUTOMATION SYSTEM AND COMPUTER PROGRAM

CROSS-REFERENCE TO RELATED APPLICATION

This application claims priority to German Patent Application DE 10 2016 121 019.6 filed Nov. 3, 2016, entitled VERFAHREN ZUM ÜBERTRAGEN VON DATENPAKETEN AUF EINER DATEN-ÜBERTRAGUNGSSTRECKE ZWISCHEN ZWEI KOMMUNIKATIONSTEILNEHMERN, AUTOMATISIERUNGSSYSTEM UND COMPUTERPROGRAMM, which is incorporated by reference herein, in the entirety and for all purposes.

FIELD

The invention relates to a method for transmitting data packets on a data transmission path between two communication subscribers. The invention also relates to an automation system.

BACKGROUND

The published patent application DE 10 2004 044 764 A1 shows a data transmission method and an automation system for using such a data transmission method.

The patent specification EP 1 307 989 B1 shows a communication method.

SUMMARY

The invention provides an improved concept for efficiently transmitting data packets on a data transmission path between two communication subscribers.

One aspect provides a method for transmitting data packets on a data transmission path between a first communication subscriber and a second communication subscriber, comprising the following steps of:
  transmitting a first data packet to the second communication subscriber by means of the first communication subscriber, the first data packet comprising at least data and an identification character,
  determining at least one first acknowledgement character on the basis of the identification character by means of the first communication subscriber,
  determining at least one second acknowledgement character on the basis of the identification character by means of the second communication subscriber if the second communication subscriber has received the first data packet,
  transmitting a second data packet comprising the second acknowledgement character to the first communication subscriber by means of the second communication subscriber,
  receiving the second data packet transmitted by the second communication subscriber by means of the first communication subscriber,
  checking, by means of the first communication subscriber, whether the received second acknowledgement character is correlated with the determined at least one first acknowledgement character in such a manner that it confirms the reception of the first data packet, and
  retransmitting the first data packet with the identical identifier to the second communication subscriber by means of the first communication subscriber if the received second acknowledgement character is not correlated with the determined at least one first acknowledgement character or the second acknowledgement character was not received by the first communication subscriber.

Another aspect provides an automation system comprising:
  a first communication subscriber and a second communication subscriber which are connected via a data transmission path and each have a connection unit for transmitting data packets on the data transmission path between the two communication subscribers,
  the connection unit of the first communication subscriber being configured to transmit a first data packet to the second communication subscriber, the first data packet comprising at least data and an identification character,
  the connection unit of the first communication subscriber being configured to determine at least one first acknowledgement character on the basis of the identification character,
  the connection unit of the second communication subscriber being configured to receive the first data packet and, if the first data packet is received, to determine at least one second acknowledgement character on the basis of the first acknowledgement character, and
  to transmit a second data packet comprising the second acknowledgement character to the first communication subscriber,
  the connection unit of the first communication subscriber being configured to receive a second data packet transmitted by the second communication subscriber and
  to check whether the received second acknowledgement character is correlated with the determined at least one first acknowledgement character in such a manner that it confirms the reception of the first data packet, and
  the connection unit of the first communication subscriber being configured to retransmit the first data packet with the identical identifier to the second communication subscriber if the received second acknowledgement character is not correlated with the determined at least one first acknowledgement character or the second acknowledgement character was not received by the first communication subscriber.

BRIEF DESCRIPTION OF THE DRAWINGS

The invention is explained in more detail below using figures, in which, in a schematic illustration in each case.

DETAILED DESCRIPTION

Figure 1:
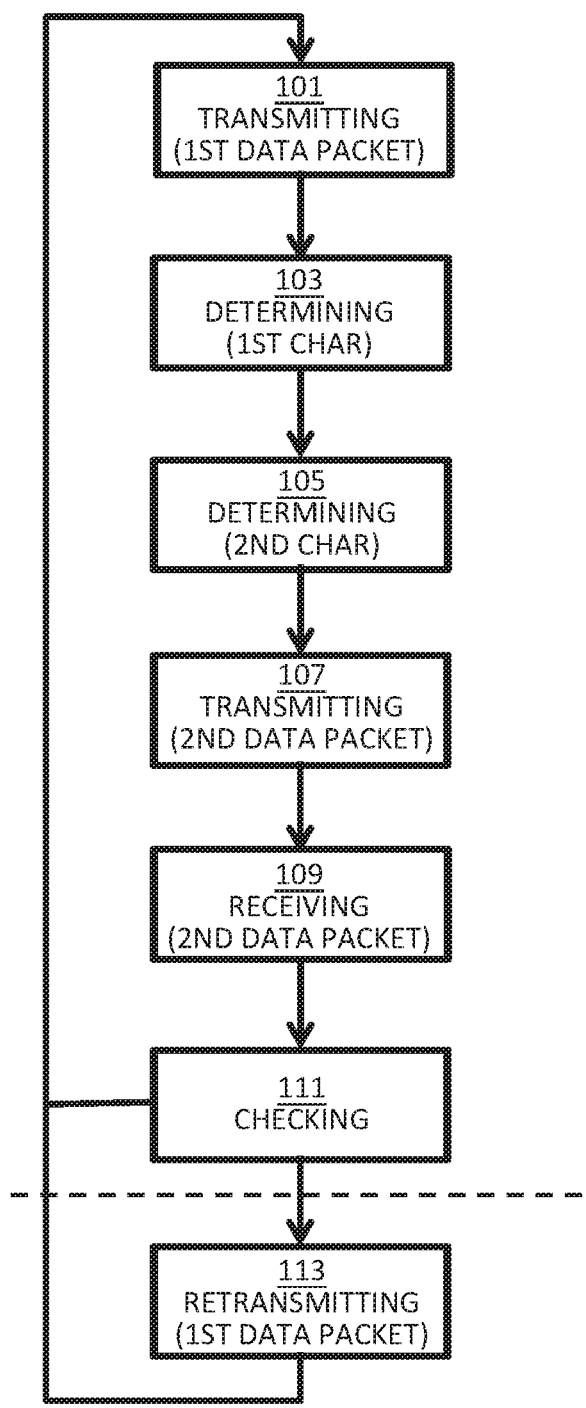
FIG. 1 shows a flowchart of a method for transmitting data packets on a data transmission path between two communication subscribers.

A data packet (the first data packet), already transmitted to a second communication subscriber, is retransmitted to the second communication subscriber by means of a first communication subscriber if the reception of a first data packet has not been acknowledged in the intended manner by means of the second communication subscriber by virtue of the latter transmitting the second acknowledgement character back to the first communication subscriber. Since there is a correlation between the second acknowledgement character and the first acknowledgement character, the first communication subscriber can determine the associated first acknowledgement character upon receiving the second acknowledgement character and therefore knows that the first data packet must have arrived at the second communication subscriber.

This therefore advantageously means that the second communication subscriber can efficiently inform the first communication subscriber that its first data packet transmitted to the second communication subscriber has also arrived at the second communication subscriber.

However, if the received second acknowledgement character is not correlated with the determined at least one first acknowledgement character or the second acknowledgement character was not received by the first communication subscriber, the first communication subscriber assumes that the first data packet did not arrive at the second communication subscriber and in this respect will retransmit the first data packet.

The technical advantage, in particular, that uninterrupted data interchange between the first and the second communication subscriber can be efficiently ensured is therefore achieved.

This also achieves the technical advantage, in particular, that an effective concept for efficiently transmitting data packets on a data transmission path between two communication subscribers is provided.

The use of such a data transmission method in an automation system is particularly advantageous, in particular, in so far as it is especially important in automation systems for data to be able to be interchanged between two communication subscribers without interruption. This is because, if the data comprise measurement data from a sensor for example, it must generally be ensured that these measurement data can also actually be provided remote from the measuring sensor in order to be able to evaluate said measurement data, for example, and to then control corresponding actions on the basis of the evaluation, for example.

If data comprise control data for controlling an actuator for example, it must also generally be ensured here that these control data arrive at the communication subscriber so that the control is also actually carried out.

One embodiment provides for the data to comprise measurement data from a sensor.

One embodiment provides for the data to comprise control data for controlling an actuator.

According to one embodiment, the first communication subscriber and/or the second communication subscriber comprise(s) a sensor for measuring or recording a physical variable.

According to one embodiment, the first communication subscriber and/or the second communication subscriber is/are connected to a sensor for recording or measuring a physical variable by means of a communication connection.

In one embodiment, the first communication subscriber and/or the second communication subscriber is/are an actuator.

In one embodiment, the first communication subscriber and/or the second communication subscriber and/or the other communication subscriber is/are connected to an actuator by means of a communication connection.

One embodiment provides for a data packet to be, for example, a message, in particular an Ethernet message, for example an EtherCAT message.

Transmission in the sense of the description comprises, in particular, the fact that the second communication subscriber operated as a slave, for example, inserts the data to be transmitted into a message which has been transmitted by the first communication subscriber operated as a master, for example. In the case of EtherCAT, the messages are only transmitted from a superordinate control unit via the master and all slaves read data in passing and insert their data in passing.

In the sense of the description, "transmission" is therefore also understood as meaning, in particular, the insertion of data packets into circulating messages irrespective of which communication subscriber sends (transmits) the message.

One embodiment provides for the at least one first acknowledgement character and/or the at least one second acknowledgement character to be a sequence of acknowledgement characters.

This achieves the technical advantage, for example, that the acknowledgement characters can be efficiently determined.

Another embodiment provides for a sequence of identifiers to be used to determine the at least one first acknowledgement character and/or the at least one second acknowledgement character.

This achieves the technical advantage, for example, that the acknowledgement characters can be efficiently determined.

Another embodiment provides for the retransmission to be carried out if a second or further data packet, the second acknowledgement character of which is not correlated with the determined at least one first acknowledgement character, is not received by means of the first communication subscriber within a predetermined time or if the second acknowledgement character was not received by the first communication subscriber within the predetermined time.

This achieves the technical advantage, for example, that it is possible to efficiently ensure that data which have not arrived at the latest after the predetermined time are retransmitted. Transmission errors are therefore advantageously compensated for at the latest after the predetermined time on account of the retransmission.

Another embodiment provides for the data packets to be cyclically transmitted, the predetermined time corresponding to a predetermined number of cycles, with the result that the retransmission is carried out if a second or further data packet, the second acknowledgement character of which is not correlated with the determined at least one first acknowledgement character, is not received by means of the first communication subscriber within the predetermined number of cycles or if the second acknowledgement character was not received by the first communication subscriber within the predetermined number of cycles.

This achieves the technical advantage, for example, that it is possible to efficiently ensure that data which have not arrived at the latest after the predetermined number of cycles are retransmitted. Transmission errors are therefore advantageously compensated for at the latest after the predetermined number of cycles on account of the retransmission.

Another embodiment provides for the first communication subscriber to comprise a plurality of buffers for storing data and a transmission buffer for storing data to be transmitted, data being read from one of the buffers and being written to the transmission buffer in order to transmit a data packet to the second communication subscriber, an identification character of a transmitted data packet indicating from which of the buffers the data in the transmitted data packet were read, with the result that the first acknowledgement character, on account of the dependence on the identification character, indicates from which of the buffers the data in the transmitted data packet were read, with the result that the received second acknowledgement character also indicates, on account of the correlation with the first acknowledgement character, from which of the buffers data in the transmitted data packet were read, it being determined for retransmission which second acknowledgement character correlated with a first acknowledgement character has not been received, with the result that the first acknowledgement character associated with this second acknowledgement character is determined, with the result that the identification character associated with this first acknowledgement character is determined, the data being read from the buffer corresponding to the determined identification character and being written to the transmission buffer in order to retransmit these data to the second communication subscriber.

This achieves the technical advantage, in particular, that, after the first data packet has been transmitted, yet other first data packets can be transmitted to the second communication subscriber without losing the possibility of retransmitting the corresponding data if the first data packet which has already been transmitted is lost. This is because said data are stored in the buffer.

In particular, the practice of providing a plurality of buffers for storing data achieves the technical advantage that a particular number of losses of data packets can be compensated for depending on the number of buffers. This is because the data packets are also stored in the buffers.

Another embodiment provides for the data in a buffer to be released for overwriting only when the received second acknowledgement character is correlated with the determined first acknowledgement character or the second acknowledgement character has been received by the first communication subscriber.

This achieves the technical advantage, in particular, that the buffer can be efficiently operated. In particular, this achieves the technical advantage that the data are available for retransmission at least until the second communication subscriber transmits the confirmation that it has received the corresponding data.

One embodiment provides for a number of the buffers to be dynamically variable.

This achieves the technical advantage, for example, that a memory available for the buffers can be efficiently used and efficient adaptation to different situations is therefore enabled, possibly at the expense of applications which are not quite so important.

One embodiment provides for a number of the buffers to be statically permanently predefined.

This achieves the technical advantage, for example, that the same sequence is always carried out irrespective of transmission errors. The probability of an overload situation occurring in the case of transmission errors and of subsequent errors occurring is therefore efficiently reduced, for example.

One embodiment provides for the second acknowledgement character to be the same as the first identification character.

This achieves the technical advantage, for example, that the checking can be efficiently carried out.

One embodiment provides for the identification character to be a number, the determination of the first acknowledgement character comprising incrementing the identification character by a particular value, for example 1, with the result that the first acknowledgement character is the same as the identification character plus the predetermined value.

This achieves the technical advantage, for example, that the first acknowledgement character can be efficiently determined.

One embodiment provides for the identification character to correspond to an instantaneous counter value of a counter which is incremented each time a data packet is transmitted to the second communication subscriber.

This achieves the technical advantage, for example, that the identification character can be efficiently determined.

Another embodiment provides for the retransmission to be carried out if the received second acknowledgement character of that data packet which is received by the first communication subscriber after the transmission of the first data packet is not correlated with the determined at least one first acknowledgement character.

This achieves the technical advantage, for example, that transmission errors can be compensated for promptly, that is to say directly after the first data packet has been transmitted.

One embodiment provides for an Ethernet-based field bus, in particular an EtherCAT field bus, to be used as the data transmission path.

This achieves the technical advantage, in particular, that the data can be efficiently transmitted.

One embodiment provides for the second communication subscriber to be operated as a master and for the first communication subscriber to be operated as a slave or vice versa.

This achieves the technical advantage, for example, that efficient communication between the two communication subscribers can be achieved. Efficient means, in particular, that the errors are rectified quickly and the communication effort is low in the normal case and in the event of errors.

One embodiment provides for the first communication subscriber to transmit the first data packet for the first time only after a request from the second communication subscriber.

This achieves the technical advantage, for example, that efficient communication between the two communication subscribers can be achieved.

One embodiment provides for the automation system to be set up or configured to carry out or perform the method for transmitting data packets on a data transmission path between two communication subscribers.

One embodiment provides for the method for transmitting data packets on a data transmission path between two communication subscribers to be carried out or performed by means of the automation system.

Technical functionalities of the automation system immediately emerge from corresponding technical functionalities of the method for transmitting data packets on a data transmission path between two communication subscribers and vice versa.

That is to say, method features emerge from corresponding system features and vice versa.

The wording "respectively" in particular comprises the wording "and/or".

One embodiment provides for the automation system to be and/or have been utilized or used in industrial automation.

A connection unit in the sense of the description is configured, for example, to code the data to be transmitted and/or to decode the received data. A connection unit in the sense of the description can also be referred to as a network connection unit.

The connection unit is configured, in particular, to generate or form a data packet to be transmitted.

One embodiment provides for the automation system to be an automation system in industrial automation.

A correlation of the received second acknowledgement character with the determined at least one first acknowledgement character such that the second acknowledgement character confirms the reception of the first data packet comprises one or more of the following cases:

An acknowledgement character in the sense of the description comprises, for example, a number (or a plurality of numbers), a letter (or a plurality of letters) or a sequence of one or more numbers and one or more letters. That is to say, for example, an acknowledgement character may comprise a numerical sequence, a letter sequence or an alphanumeric sequence.

The first and second acknowledgement characters are the same.

The second acknowledgement character is in a range of values of the first acknowledgement character.

The first acknowledgement character and the second acknowledgement character are connected to one another by means of a mathematical relationship R, for example. That is to say, for example, that R is (first acknowledgement character x, =second acknowledgement character x), where R in this case is a linear mathematical function, for example.

A further relationship which is frequently used and is provided according to one embodiment is R (x, x−n), where n is the distance from the acknowledgement character which has already been previously received. It indicates the situation in which it is used to express the reception of a sequence of data packets without gaps.

Both connection units of the communication subscribers therefore have the knowledge, for example, of how an acknowledgement character is determined from an identification character.

That is to say, for example, a rule is predefined, for example, and indicates how an acknowledgement character is determined from an identification character.

For example, the rule is respectively stored in the two communication subscribers.

FIG. 1 shows a flowchart of a method for transmitting data packets on a data transmission path between two communication subscribers.

The method comprises the following steps of:
- transmitting 101 a first data packet to the second communication subscriber by means of the first communication subscriber, the first data packet comprising at least data and an identification character,
- determining 103 at least one first acknowledgement character on the basis of the identification character by means of the first communication subscriber,
- determining 105 at least one second acknowledgement character on the basis of the identification character by means of the second communication subscriber if the second communication subscriber has received the first data packet,
- transmitting 107 a second data packet comprising the second acknowledgement character to the first communication subscriber by means of the second communication subscriber,
- receiving 109 the second data packet transmitted by the second communication subscriber by means of the first communication subscriber,
- checking 111, by means of the first communication subscriber, whether the received second acknowledgement character is correlated with the determined at least one first acknowledgement character in such a manner that it confirms the reception of the first data packet, and
- retransmitting 113 the first data packet with the identical identifier to the second communication subscriber by means of the first communication subscriber if the received second acknowledgement character is not correlated with the determined at least one first acknowledgement character or the second acknowledgement character was not received by the first communication subscriber, and
- starting the subsequent sequence, this representing a logical sequence which may also be carried out in an overlapping manner depending on the requirements with respect to the sequences.

If it is determined in checking step 111 that the received second acknowledgement character is correlated with the determined at least one first acknowledgement character in such a manner that it confirms the reception of the first data packet, the sequence is directly restarted without running through the transmission step 113. This is indicated by the corresponding arrow and the dashed line between steps 111 and 113.

Only if it is determined in checking step 111 that the received second acknowledgement character is not correlated with the determined at least one first acknowledgement character or the second acknowledgement character was not received by the first communication subscriber is the transmission step 113 run through before the sequence is restarted.

Figure 2:
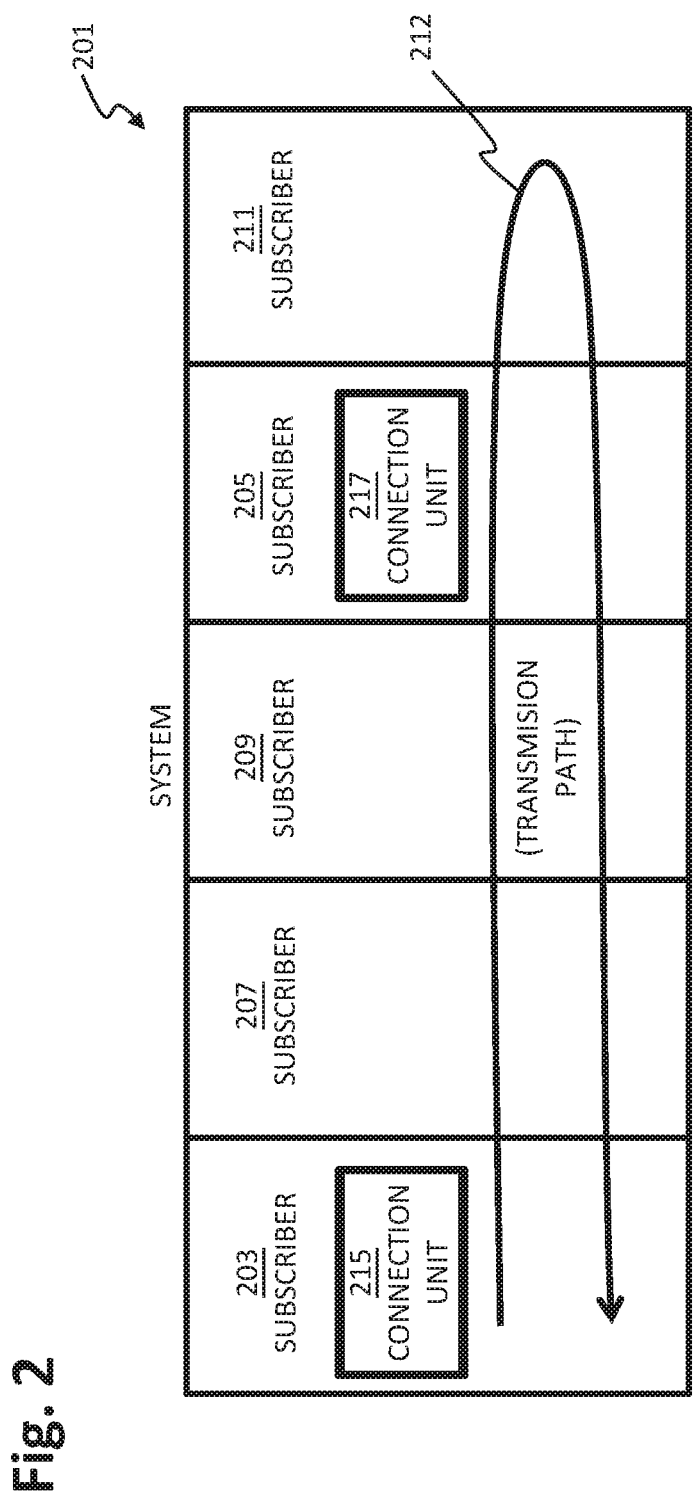
FIG. 2 shows an automation system.

FIG. 2 shows an automation system 201.

The automation system 201 comprises two communication subscribers 203, 205 which are connected via a data transmission path. This data transmission path is symbolically represented in FIG. 2 by means of an arrow with the reference symbol 212, the direction of the arrow predefining a communication direction here, for example. Data packets are transmitted via the data transmission path 212.

The communication subscriber with the reference symbol 205 is referred to as the first communication subscriber below. The communication subscriber with the reference symbol 203 is referred to as the second communication subscriber below.

The second communication subscriber 203 comprises a connection unit 215. The first communication subscriber 205 likewise comprises a connection unit 217.

Both connection units 215, 217 are configured to transmit data packets on the data transmission path 212 between the two communication subscribers 203, 205.

The connection unit 217 of the first communication subscriber 205 is configured to transmit a first data packet to the second communication subscriber 203, the first data packet comprising at least data and an identification character.

The connection unit 217 of the first communication subscriber 205 is also configured to determine at least one first acknowledgement character on the basis of the identification character.

The connection unit 215 of the second communication subscriber 203 is configured to receive the first data packet and, if the first data packet is received, to determine at least one second acknowledgement character on the basis of the first acknowledgement character and to transmit a second data packet comprising the second acknowledgement character to the first communication subscriber 205.

The connection unit 217 of the first communication subscriber 205 is configured to receive a second data packet transmitted by the second communication subscriber 203 and to check whether the received second acknowledgement character is correlated with the determined at least one first acknowledgement character in such a manner that it confirms the reception of the first data packet.

The connection unit 217 of the first communication subscriber 205 is configured to retransmit the first data packet with the identical identifier to the second communication subscriber 203 if the received second acknowledgement character is not correlated with the determined at least one first acknowledgement character or the second acknowledgement character was not received by the first communication subscriber 205.

In special embodiments, that is to say according to exemplary embodiments, provision is made for the first communication subscriber 205 to be operated as a slave and for the second communication subscriber 203 to be operated as a master.

The automation system 201 comprises, for example, further communication subscribers 207, 209 and 211 which are likewise operated as a slave, for example. These further communication subscribers 207, 209, 211 are also connected to the second communication subscriber 203 operated as a master and to the first communication subscriber 205 operated as a slave via the data transmission path 212.

A data packet transmitted by the master, that is to say the second communication subscriber 203, passes through the individual slaves in the following order: slave 207, slave 209, slave 205, slave 211 and, from there, back to the second communication subscriber 203 via the slave 205, the slave 209 and the slave 207.

Figure 3:
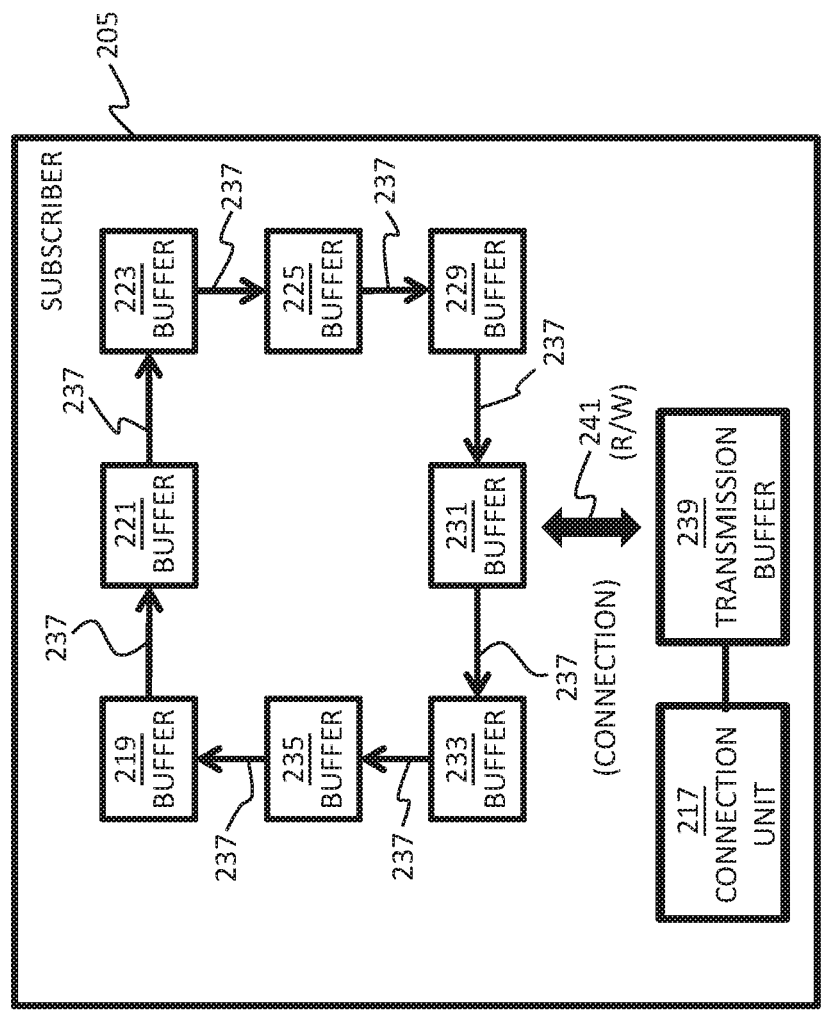
FIG. 3 shows a communication subscriber of the automation system from FIG. 2.

The method of operation possible according to one embodiment of the invention or the operation of the first communication subscriber 205 is explained further below with reference to FIG. 3.

The first communication subscriber 205 comprises eight buffers 219, 221, 223, 225, 229, 231, 233 and 235. Data which are intended to be transmitted and/or have been transmitted to the second communication subscriber 203, for example, can be and/or are stored in these buffers.

The eight buffers can be read and transmitted cyclically in succession, for example, with the result that the buffer 219 is read and transmitted in one cycle and the buffer 221 is read and transmitted in a following cycle and so on until it is the turn of the buffer 219 again. In order to graphically illustrate this cyclical reading and transmission more clearly, the individual buffers are connected using arrows having the reference symbol 237.

The first communication subscriber 205 also comprises a transmission buffer 239 for storing data to be transmitted. That is to say, in order to transmit data to the second communication subscriber 203, data are read from one of the eight buffers 219 to 235 and are written to the transmission buffer 239. The transmission buffer 239 is the logical entity and the write process is the trigger for a transmission operation, that is to say it is possible to dispense with the copying of the data in one implementation for reasons of efficiency. The connection unit 217 is configured, in particular for this purpose, to read the data from one of the buffers and to write said data to the transmission buffer 239. The connection unit 217 is also configured, in particular, to form a data packet which comprises the data from the transmission buffer 239 and an identification character, the identification character indicating from which of the eight buffers 219 to 235 the data have been read.

For example, the identification character is a number corresponding to a numbering of the eight buffers.

The reading or transmission from one of the buffers 219 to 235 and the writing of the data which have been read to the transmission buffer 239 are indicated symbolically by means of a double-headed arrow with the reference symbol 241.

Provision is now made, for example, for the second communication subscriber 203 operated as a master to cyclically fetch new data from the first communication subscriber 205 operated as a slave. That is to say, the second communication subscriber 203 transmits a request to the first communication subscriber 205 to transmit new data to the second communication subscriber. The data to be transmitted are then read from one of the eight buffers 219 to 235 and are written to the transmission buffer 239. The transmission buffer 239 therefore loads the data into the data transmission path 212 which is comprised by a communication system, for example.

The connection unit 217 also controls the transmission buffer 239 in such a manner that the latter loads an identification character, for example a sequence number, into the data to be transmitted, which identification character indicates, for example, from which of the eight buffers the data have been read.

A first data packet which comprises the data to be transmitted and the identification character is therefore generated.

The first communication subscriber 205 additionally determines at least one first acknowledgement character on the basis of the identification character.

The first data packet is transmitted back to the second communication subscriber 203 via the transmission path 212. The second communication subscriber 203 receives the first data packet and determines at least one second acknowledgement character on the basis of the identification character.

The second communication subscriber 203 then transmits a second data packet comprising the second acknowledgement character to the first communication subscriber 205.

The first communication subscriber 205 receives the second data packet and checks whether the received second acknowledgement character is correlated with the determined at least one first acknowledgement character in such a manner that it confirms the reception of the first data packet.

If the checking has revealed that the received second acknowledgement character is correlated with the determined at least one first acknowledgement character in such a manner that it confirms the reception of the first data packet, the data in that buffer from which the data in the first data packet were read are released for overwriting.

In contrast, retransmission of the first data packet with the identical identifier to the second communication subscriber 203 by means of the first communication subscriber 205 is provided if the received second acknowledgement character is not correlated with the determined at least one first acknowledgement character or the second acknowledgement character was not received by the first communication subscriber 205.

The first communication subscriber 205 has, for example, a temporal expectation of when it can expect a second acknowledgement character which has been transmitted back.

That is to say, for example, the first communication subscriber 205 expects the second data packet comprising the second acknowledgement character, which is correlated with the first acknowledgement character in such a manner that it confirms the reception of the first data packet, at the latest in the third (generally in a predetermined) cycle calculated from the cycle of transmitting the first data packet. If a second data packet comprising such a second acknowledgement character is then not received by means of the first communication subscriber 205 in the third (generally predetermined) cycle, the first communication subscriber 205 retransmits the corresponding data to the second communication subscriber 203.

In summary, the invention provides an efficient concept which makes it possible to efficiently transmit data packets on a data transmission path between two communication subscribers. In particular, uninterrupted data interchange can be efficiently ensured. In particular, an existing bandwidth can be efficiently used as a result.

What is claimed is:

1. A method for transmitting data packets on a data transmission path between a first communication subscriber and a second communication subscriber, comprising the following steps of:
   transmitting a first data packet to the second communication subscriber by means of the first communication subscriber, the first data packet comprising at least data and an identification character,
   determining at least one first acknowledgement character on the basis of the identification character by means of the first communication subscriber,
   determining at least one second acknowledgement character on the basis of the identification character by means of the second communication subscriber if the second communication subscriber has received the first data packet,
   transmitting a second data packet comprising the second acknowledgement character to the first communication subscriber by means of the second communication subscriber,
   receiving the second data packet transmitted by the second communication subscriber by means of the first communication subscriber,
   checking, by means of the first communication subscriber, whether the received second acknowledgement character is correlated with the determined at least one first acknowledgement character in such a manner that it confirms the reception of the first data packet, and
   retransmitting the first data packet with the identification character to the second communication subscriber by means of the first communication subscriber if the received second acknowledgement character is not correlated with the determined at least one first acknowledgement character or the second acknowledgement character was not received by the first communication subscriber.

2. The method according to claim 1, the at least one first acknowledgement character and/or the at least one second acknowledgement character being a sequence of acknowledgement characters.

3. The method according to claim 1, a sequence of identifiers being used to determine the at least one first acknowledgement character and/or the at least one second acknowledgement character.

4. The method according to claim 1, the retransmission being carried out if a second or further data packet, the second acknowledgement character of which is not correlated with the determined at least one first acknowledgement character, is not received by means of the first communication subscriber within a predetermined time or if the second acknowledgement character was not received by the first communication subscriber within the predetermined time.

5. The method according to claim 4, the data packets being cyclically transmitted, the predetermined time corresponding to a predetermined number of cycles, with the result that the retransmission is carried out if a second or further data packet, the second acknowledgement character of which is not correlated with the determined at least one first acknowledgement character, is not received by means of the first communication subscriber within the predetermined number of cycles or if the second acknowledgement character was not received by the first communication subscriber within the predetermined number of cycles.

6. The method according to claim 1, the first communication subscriber comprising a plurality of buffers for storing data and a transmission buffer for storing data to be transmitted, data being read from one of the buffers and being written to the transmission buffer in order to transmit a data packet to the second communication subscriber, an identification character of a transmitted data packet indicating from which of the buffers the data in the transmitted data packet were read, with the result that the first acknowledgement character, on account of the dependence on the identification character, indicates from which of the buffers the data in the transmitted data packet were read, with the result that the received second acknowledgement character also indicates, on account of the correlation with the first acknowledgement character, from which of the buffers the data in the transmitted data packet were read, it being determined for retransmission which second acknowledgement character correlated with a first acknowledgement character has not been received, with the result that the first acknowledgement character associated with this second acknowledgement character is determined, with the result that the identification character associated with this first acknowledgement character is determined, the data being read from the buffer corresponding to the determined identification character and being written to the transmission buffer in order to retransmit these data to the second communication subscriber.

7. The method according to claim 6, the data in a buffer being released for overwriting only when the received second acknowledgement character is correlated with the determined first acknowledgement character or the second acknowledgement character has been received by the first communication subscriber.

8. The method according to claim 1, the second acknowledgement character being the same as the first identification character.

9. The method according to claim 1, an Ethernet-based field bus, in particular an EtherCAT field bus, being used as the data transmission path.

10. An automation system comprising:
    a first communication subscriber and a second communication subscriber which are connected via a data transmission path and each have a connection unit for transmitting data packets on the data transmission path between the two communication subscribers,
    the connection unit of the first communication subscriber being configured to transmit a first data packet to the second communication subscriber, the first data packet comprising at least data and an identification character,
    the connection unit of the first communication subscriber being configured to determine at least one first acknowledgement character on the basis of the identification character,
    the connection unit of the second communication subscriber being configured to receive the first data packet and, if the first data packet is received, to determine at least one second acknowledgement character on the basis of the first acknowledgement character, and to transmit a second data packet comprising the second acknowledgement character to the first communication subscriber, the connection unit of the first communication subscriber being configured to receive a second data packet transmitted by the second communication subscriber and to check whether the received second acknowledgement character is correlated with the determined at least one first acknowledgement character in such a manner that it confirms the reception of the first data packet, and the connection unit of the first communication subscriber being configured to retransmit the first data packet with the identification character to the second communication subscriber if the received second acknowledgement character is not correlated with the determined at least one first acknowledgement character or the second acknowledgement character was not received by the first communication subscriber.

11. The automation system according to claim 10, the at least one first acknowledgement character and/or the at least one second acknowledgement character being a sequence of acknowledgement characters.

12. The automation system according to claim 10, a sequence of identifiers being used to determine the at least one first acknowledgement character and/or the at least one second acknowledgement character.

13. The automation system according to claim 10, the retransmission being carried out if a second or further data packet, the second acknowledgement character of which is not correlated with the determined at least one first acknowledgement character, is not received by means of the first communication subscriber within a predetermined time or if the second acknowledgement character was not received by the first communication subscriber within the predetermined time.

14. The automation system according to claim 13, the data packets being cyclically transmitted, the predetermined time corresponding to a predetermined number of cycles, with the result that the retransmission is carried out if a second or further data packet, the second acknowledgement character of which is not correlated with the determined at least one first acknowledgement character, is not received by means of the first communication subscriber within the predetermined number of cycles or if the second acknowledgement character was not received by the first communication subscriber within the predetermined number of cycles.

15. The automation system according to claim 10, the first communication subscriber comprising a plurality of buffers for storing data and a transmission buffer for storing data to be transmitted, data being read from one of the buffers and being written to the transmission buffer in order to transmit a data packet to the second communication subscriber, an identification character of a transmitted data packet indicating from which of the buffers the data in the transmitted data packet were read, with the result that the first acknowledgement character, on account of the dependence on the identification character, indicates from which of the buffers the data in the transmitted data packet were read, with the result that the received second acknowledgement character also indicates, on account of the correlation with the first acknowledgement character, from which of the buffers the data in the transmitted data packet were read, it being determined for retransmission which second acknowledgement character correlated with a first acknowledgement character has not been received, with the result that the first acknowledgement character associated with this second acknowledgement character is determined, with the result that the identification character associated with this first acknowledgement character is determined, the data being read from the buffer corresponding to the determined identification character and being written to the transmission buffer in order to retransmit these data to the second communication subscriber.

16. The automation system according to claim 15, the data in a buffer being released for overwriting only when the received second acknowledgement character is correlated with the determined first acknowledgement character or the second acknowledgement character has been received by the first communication subscriber.

17. The automation system according to claim 10, the second acknowledgement character being the same as the first identification character.

18. The automation system according to claim 10, an Ethernet-based field bus, in particular an EtherCAT field bus, being used as the data transmission path.

* * * * *